Figures 1, 2:
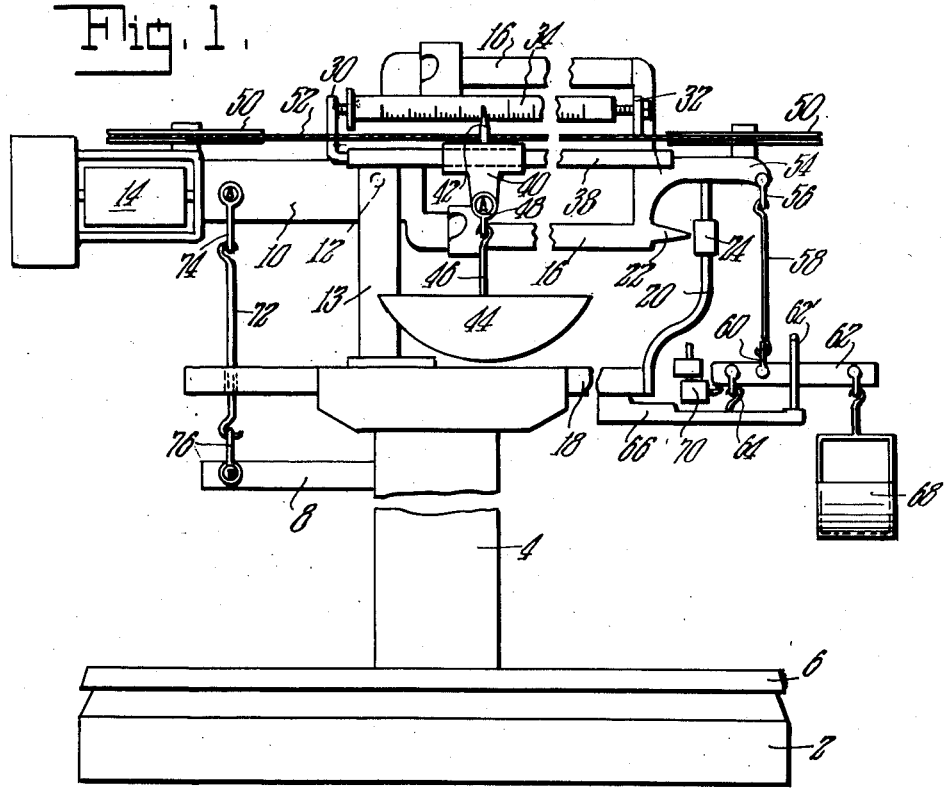

June 18, 1957  L. P. LANGEVIN  2,796,250
APPARATUS FOR COUNTING OBJECTS BY WEIGHT
Filed July 26, 1954

INVENTOR.
Lloyd P. Langevin

United States Patent Office 2,796,250
Patented June 18, 1957

2,796,250

APPARATUS FOR COUNTING OBJECTS BY WEIGHT

Lloyd P. Langevin, Springfield, Mass.

Application July 26, 1954, Serial No. 445,600

1 Claim. (Cl. 265—30)

This invention relates to improvements in counting and weighing scales and is directed to improvements in scales adapted to provide a predetermined number of objects by weight by determining the count of a plurality of objects.

It is common practice to count a predetermined number of objects by weighing means to obviate actual counting of the objects. Where it is desired to count such objects as bolts, screws, nuts and the like in the thousands, the present day apparatus is not adequate.

It is one object of the present invention to provide apparatus to facilitate the counting of objects in the order of thousands or parts of thousands thereby to provide lots of greater count and more expeditiously than has formerly been possible.

It is another object of the invention to provide apparatus for determining the exact count of a plurality of objects in the order of thousands and portions thereof.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is an elevational view more or less diagrammatically of scale apparatus embodying the novel features of the invention; and Fig. 2 is a plan view of the apparatus shown in Fig. 1.

Referring now to the drawings more in detail, the invention will be fully described.

Scale apparatus is shown in a general way in Fig. 1 and includes a base 2 having a post or column 4 extending upwardly therefrom. A platform 6 is provided in association with the base and is connected in the usual manner to a lever 8.

A main beam 10 is pivoted at 12 in a suitable manner to a stand 13 extending upwardly from post 4 and has the usual balance ball 14. Said beam 10 may include one or more weighing beams such as 16 usual in scale construction.

A member 18 extending to the right from the column has fixed thereto a vertically extending upright or post 20 and the main beam has a pointer 22 or other means for registering with a member 24 on said upright post 20. When the scale is in balance the pointer 22 will align with a portion of member 24.

Inner and outer transverse members 26 and 28 are secured to the beam and have upstanding portions 30 and 32 respectively, see Fig. 2. An elongated counter bar 34 has end portions secured to the upstanding portions 30 and 32.

The counter bar 34 is graduated and in accordance with the form of the invention being described, the graduations will be from 0 to 1000.

A track 38 is secured at opposite ends to forward ends of members 26 and 28. A slide 40 is slidable therealong and has a pointer 42 for alignment with indications of count on the count bar 34.

A primary ratio pan 44 has a hook 46 in engagement with a hanger 48 of the slide. Wheels 50 are rotatable at inner and outer ends of the main beam 10 and a flexible cable 52 therearound is connected to the slide 40.

An extension 54 of the main beam carries a hanger 56. A counterpoise stem 58 has an upper end connected to hanger 56 and a lower end connected to a hanger 60 of a cap arm 62. The cap arm 62 is pivotally connected at 64 to an extension 66 fixed to the member 18.

A secondary ratio pan 68 is suspended from the outer end of the cap arm. Gravity ball means 70 is carried by the inner end of the cap arm. A stop 62' of member 66 limits upward movement of the cap arm 62.

A rod 72 is connected at its opposite ends to the main beam 10 and member 8 by means 74 and 76.

As an illustration, the parts may be adapted and arranged to count out one thousand. An empty receptacle is placed on the platform 6, the scale is balanced with pointer 42 at zero of the counter bar 34. One object is placed in ratio pan 68 and sufficient objects are placed in the receptacle to bring the scale into balance. When it is desired to count out more than a thousand objects, the pointer 42 of weight pan 44 is set to the number desired on the counter bar 34 and a predetermined number of the objects, say five according to the proportion of the parts, are placed in ratio pan 44. One object is placed in ratio pan 68 and sufficient objects are placed in the receptacle on the platform to balance the scale.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A scale comprising in combination, a support structure having a base and a column extending upwardly and a platform movably mounted on said base, an elongated horizontally extending main beam pivoted intermediate its ends on said column and having a weighing beam integral with said main beam and located at one side of the pivotal axis thereof and provided with a pointer, an elongated counter bar carried by said beam and provided with longitudinally arranged indicia, a track carried by said main beam and having a slide movable therealong and provided with means for registering with said indicia, a post fixed to and extending vertically upwardly from said column and being in substantial alignment with said pointer, an extension fixed to and extending horizontally outwardly from said column and beneath said weighing beam, means on said post with which said pointer is registrable to indicate balance of said scale, an elongated horizontally extending cap arm disposed above said extension and swingably connected adjacent an inner end to said extension and having a gravity ball at its inner end, a ratio pan pivotally connected to the outer end of said cap arm, and a counterpoise stem pivotally connected at upper and lower ends to the outer extremity of said main beam and to a point intermediate opposite ends of said cap arm.

References Cited in the file of this patent

UNITED STATES PATENTS

| 659,830 | Sanderson | Oct. 16, 1900 |
| 1,188,069 | Hopgood | June 20, 1916 |
| 1,330,593 | King | Feb. 10, 1920 |
| 1,764,275 | Mittendorf | June 17, 1930 |

FOREIGN PATENTS

| 561,361 | Great Britain | May 16, 1944 |